United States Patent [19]
Allport et al.

[11] 3,959,708
[45] May 25, 1976

[54] BATTERY CHARGING SYSTEMS FOR ROAD VEHICLES

[75] Inventors: Maurice James Allport, Stourbridge; David Gordon Williams, Harborne, both of England

[73] Assignee: The Lucas Electrical Company Limited, England

[22] Filed: Dec. 4, 1974

[21] Appl. No.: 529,355

[30] Foreign Application Priority Data
Dec. 8, 1973 United Kingdom............... 57011/73

[52] U.S. Cl. .................................. 320/48; 320/64; 322/28; 322/99; 317/33 VR
[51] Int. Cl.[2] ......................................... H02J 7/14
[58] Field of Search ............ 320/48, 61, 64; 322/28, 322/99; 317/13 R, 33 VR

[56] References Cited
UNITED STATES PATENTS 3,469,168   9/1969   Harland, Jr. et al. ............ 322/28 X
3,764,879   10/1973  Hill ................................. 322/99 X

*Primary Examiner*—J D Miller
*Assistant Examiner*—Robert J. Hickey
*Attorney, Agent, or Firm*—Kane, Dalsimer, Kane, Sullivan and Kurucz

[57] ABSTRACT

A road vehicle battery charging system includes an alternator and a rectifier assembly connected to apply d.c. to the battery. A further rectifier provides d.c. to a separate line from which current is drawn for the field coil under the control of a voltage regulator. The line is connected via a series circuit including a resistor and the vehicle ignition switch to one side of the battery, this resistor forming part of a switching circuit which operates a warning lamp whenever the voltage on the separate line is substantially less than voltage on said one side of the battery.

4 Claims, 1 Drawing Figure

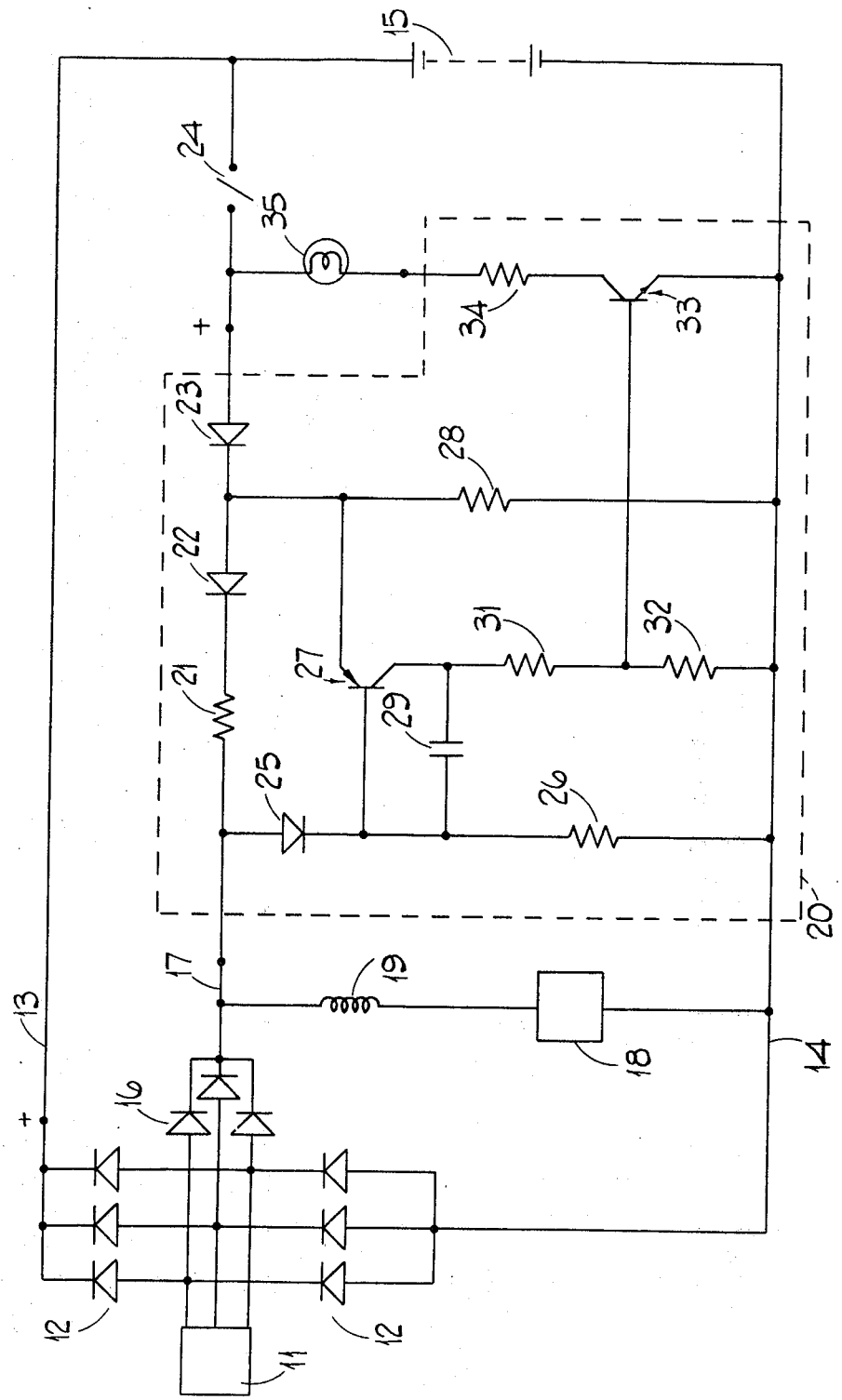

BATTERY CHARGING SYSTEMS FOR ROAD VEHICLES

This invention relates to battery charging systems for road vehicles.

A system according to the invention comprises in combination an alternator and associated rectifier supplying power to first and second d.c. supply lines between which the battery is connected, a third supply line which is fed by the alternator and in use is at a potential substantially equal to the potential of the first supply line, a voltage regulator connected between the third and second supply lines and controlling the output of the alternator, a series circuit interconnecting the third and first supply lines, said series circuit including a resistor and the ignition switch of the vehicle, and switching means sensitive to the potential across said resistor for holding a warning lamp off provided the third supply line is at substantially the same potential as the first supply line.

Preferably, said series circuit includes the resistor, a diode and the ignition switch, the diode preventing flow of current from the third supply to the first supply line, and the switching means being sensitive to the potential across the resistor and diode. A second similarly poled diode may be provided between the first diode and the ignition switch.

Preferably, the switching means includes a transistor having its emitter connected to the junction of the first and second diodes and its base connected to the junction of a further diode and a resistor connected in series between a third and second supply line, the collector current of the transistor controlling the warning lamp.

The accompanying drawing is a circuit diagram illustrating one example of the invention.

Referring to the drawing, a three phase alternator 11 supplies power through a full wave rectifier 12 to positive and negative supply lines 13, 14 between which the battery 15 of a road vehicle is connected. The alternator also provides power through three additional dodes 16 to a supply line 17 which in use will be at substantially the same potential as the line 13. A voltage regulator 18 of any convenient known form is connected in series with the field winding 19 of the alternator between the lines 17, 14 and controls the output of the alternator.

The line 17 is connected to the line 13 through a series circuit including a resistor 21, a pair of diodes 22, 23 and the ignition switch 24 of the vehicle. The diodes 22, 23 are similarly poled and prevent flow of current from the line 17 to the line 13.

Connected in series between the lines 17, 14 are a diode 25 and a resistor 26, the junction of the diode 25 and resistor 26 being connected to the base of a p-n-p transistor 27 having its emitter connected to the junction of the diodes 22, 23, and also connected through a resistor 28 to the line 14. The collector and base of the transistor 27 are bridged by a capacitor 29, and the collector of the transistor 27 is further connected through resistors 31, 32 in series to the line 14. The junction of the resistors 31, 32 is connected to the base of an n-p-n transistor 33 having its emitter connected to the line 14 and its collector connected to the junction of the diode 23 and ignition switch 24 through a resistor 34 and a warning lamp 35 in series.

When the ignition switch 24 is closed and the alternator is not producing an output, current flows through the diodes 23, 22 to the line 17, and the regulator 18 energises the field winding 19. At this stage, the emitter of the transistor 27 is positive with respect to its base and so the transistor 27 turns on, providing current to the base of the transistor 33, which turns on to illuminate the warning lamp 35. As soon as the alternator produces an output, the base of the transistor 27 will be positive with respect to its emitter, and so the transistor 27 turns off, the transistor 33 turns off and the warning lamp 35 is extinguished. However, if at any time the potential on the line 17 becomes substantially less than the potential on the line 13, then the warning lamp 35 will turn on again. A warning will therefore be given if, for example, the lead from the diodes 16 feeding the line 17 becomes disconnected, or if there should be an open circuit in the field of the alternator.

The diode 22 ensures that the transistor 27 is turned off when the circuit is operating normally, but depending on the characteristics of the transistor 27 and the ratio of the resistors 21, 26, the diode 22 may in some cases be omitted. The diode 25 is provided to offset the base potential of the transistor 27 from the line 17 by the voltage drop across a diode, and a diode 23 is provided to protect the transistor 27 against possible damage as a result of alternator-to-battery surge currents which can flow under certain fault conditions. The resistor 34 prevents damage to the transistor 33 as a result of surges when the lamp 35 is cold.

We claim:

1. A battery charging system for a road vehicle comprising in combination an alternator and associated rectifier supplying power to first and second d.c. supply lines between which the battery is connected, a third supply line which is fed by the alternator and in use is at a potential substantially equal to the potential of the first supply line, a voltage regulator connected between the third and second supply lines and controlling the output of the alternator, a series circuit interconnecting the third and first supply lines, said series circuit including a resistor and the ignition switch of the vehicle, and switching means sensitive to the potential across said resistor for holding a warning lamp off provided the third supply line is at substantially the same potential as the first supply line, said series circuit further including a diode the diode preventing flow of current from the third supply to the first supply, and the switching means being sensitive to the potential across the resistor and diode.

2. A system as claimed in claim 1 in which a second similarly poled diode is provided between the first diode and the ignition switch.

3. A system as claimed in claim 2 in which the switching means includes a transistor having its emitter connected to the junction of the first and second diodes and its base connected to the junction of a further diode and a resistor connected in series between the third and second supply line, the collector current of the transistor controlling the warning lamp.

4. A system as claimed in claim 3 including a further transistor having its base connected to a resistance chain in the collector circuit of the first mentioned transistor, the lamp being connected in the collector circuit of said second transistor which is arranged to conduct when the first mentioned transistor conducts.

* * * * *